US007567587B1

(12) United States Patent
Mlazgar et al.

(10) Patent No.: US 7,567,587 B1
(45) Date of Patent: Jul. 28, 2009

(54) METHOD AND ARCHITECTURE FOR THE EXTRACTION AND/OR INSERTION OF SONET OR SDH PATH OVERHEAD DATA STREAMS

(75) Inventors: Kevin Mlazgar, Vancouver (CA); Pierre Vaillancourt, Vancouver (CA); Alexandre Fortin, Laval (CA)

(73) Assignee: PMC-Sierra, Inc., Santa Clara ( * ) Notice: Subject to any disclaimer, the term of this patent is extended or adjusted under 35 U.S.C. 154(b) by 833 days.

(21) Appl. No.: 10/753,446

(22) Filed: Jan. 9, 2004

Related U.S. Application Data (60) Provisional application No. 60/439,028, filed on Jan. 10, 2003, provisional application No. 60/490,539, filed on Jul. 29, 2003.

(51) Int. Cl.
*H04J 3/24* (2006.01)
(52) U.S. Cl. ..................................... 370/474
(58) Field of Classification Search ................ 370/474, 370/466, 405
See application file for complete search history.

(56) References Cited

U.S. PATENT DOCUMENTS

| 5,568,486 | A | * | 10/1996 | Huscroft et al. | .......... 370/395.2 |
| 5,600,648 | A | | 2/1997 | Furuta et al. | |
| 5,764,626 | A | * | 6/1998 | VanDervort | ................. 370/232 |
| 6,502,197 | B1 | | 12/2002 | Raza | |
| 6,697,373 | B1 | * | 2/2004 | Sandstrom | .................. 370/405 |
| 7,027,447 | B2 | * | 4/2006 | Robertson et al. | ...... 370/395.62 |
| 7,035,292 | B1 | * | 4/2006 | Giorgetta et al. | ............ 370/509 |
| 7,139,271 | B1 | * | 11/2006 | Parruck et al. | ............... 370/392 |
| 7,139,286 | B2 | * | 11/2006 | Akaike et al. | ............... 370/466 |

FOREIGN PATENT DOCUMENTS

WO    WO 93/22852    11/1993

OTHER PUBLICATIONS

Venkataraman, R., "Designing SONET/ATM layer processing ASICs using embedded approach ," Computers and Communications, 1995. Conference Proceedings of the 1995 IEEE Fourteenth Annual International Phoenix Conference on, vol., No., pp. 437-443, Mar. 28-31, 1995.*

* cited by examiner

*Primary Examiner*—Hassan Kizou
*Assistant Examiner*—Jeffrey M Rutkowski
(74) *Attorney, Agent, or Firm*—Curtis B. Behmann; Borden Ladner Gervais LLP (57) ABSTRACT

A method and architecture for the extraction of data from or the insertion of data into Synchronous Optical Network (SONET) or Synchronous Digital Hierarchy (SDH) frames is disclosed. The method and architecture provides an interface that permits the time-multiplexed data streams being extracted or inserted to have variable data-rates and no fixed alignment with respect to each other. The extraction and insertion interface accommodates for variable POH data rates and alignment inconsistencies of POH bytes amongst different paths due to floating pointer positions. The interface operates at the lowest possible frequency that can still accommodate the minimum spacing between any two consecutive words of data for a given data stream. In the insertion case, the frequency of operation chosen also allows the pipelining of requests as well as the pipelining of the subsequent associated data in response. The implementation of the present invention minimizes the amount of storage and enables a relatively low required frequency of operation while maintaining a smooth clock. In addition, in the insertion case, the pipelined nature of the interface provides flexibility in meeting interface timing.

24 Claims, 7 Drawing Sheets

METHOD AND ARCHITECTURE FOR THE EXTRACTION AND/OR INSERTION OF SONET OR SDH PATH OVERHEAD DATA STREAMS

RELATED APPLICATIONS

The present application claims the benefit of a first provisional application Ser. No. 60/439,028, filed Jan. 10, 2003, and a second provisional application Ser. No. 60/490,539, filed Jul. 29, 2003.

BACKGROUND OF THE INVENTION

1. Field of the Invention

The present invention relates to the efficient extraction and insertion of particular data streams to and from another data stream. More particularly, the present invention relates to the extraction and insertion of Path Overhead (POH) data streams to and from POH data streams in Synchronous Optical Network (SONET) or Synchronous Digital Hierarchy (SDH) frames.

2. Description of the Prior Art

The use of Synchronous Optical Network (SONET) and Synchronous Digital Hierarchy (SDH) is predominant in modern telecommunications systems and is generally implemented using integrated circuits. The SONET/SDH protocol and architecture formats data into high-speed frames having a standard number of bytes. The basic respective units of a SONET/SDH digital transmission system are a synchronous transport signal level one, or STS-1, of the synchronous transport signal STS-N (wherein, N is a suffix indicating the size of the STS), and a synchronous transport module level one, or STM-1, of the synchronous transport signal STM-N (wherein, N is a suffix indicating the size of the STM). A SONET STS-1 is equivalent to a SDH STM-0. Both the SONET and SDH terminologies are used throughout this disclosure. All acronyms with a dash (/) indicate both terminologies.

The STS-1/STM-0 frame consists of 9 rows by 90 columns of bytes, for a total of 810 bytes. The first three columns are reserved for SONET transport overhead (TOH) or SDH section overhead (SOH) including the payload pointers. The remaining 87 columns of the STS-1/STM-0 frame are allocated for "user" data, otherwise referred to as the payload. The structure of the payload is defined by a synchronous payload envelope (SPE).

The frames are transmitted at a rate of 8,000 frames per second (or once every 125 microseconds) to provide a 51.84 Mbps signal rate for STS-1/STM-0. Higher rate SONET/SDH formats essentially follow the same format of the STS-1 protocol. All SONET/SDH frames contain exactly nine rows and are transmitted at 8,000 times per second. The only variable is the number of columns, or sub-columns. For example, a STS-3 frame consists of 9 rows and is sent 8,000 times per second; however, a STS-3 frame is 270 columns wide and its corresponding transmission rate is 155.52 Mbps. Similarly, higher order STS-N formats (e.g., STS-12, STS-48, etc.) have proportionally wider frame formats containing a greater number of interleaved columns and faster bit transmission rates.

In SDH systems, virtual containers (VC-N) function to support the connections between different path layers in synchronous transmission. The VC-N consists of the payload and the path overhead (POH), wherein for VC-N, N is the suffix indicating the size of the virtual container. The virtual containers will contain tributary units (TU). The TUs provide adaptability between higher-order and lower-order path layers such that lower-order VCs can be mapped into higher-order VCs through a TU or a TU Group (TUG). A TU is created by attaching a TU pointer to a lower-order VC. The role of the tributary unit group (TUG) is to collect one or more TUs and load them onto a fixed location on the payload of a higher-order VC.

Finally, a STM-N frame is structured with administrative units (AU) and administrative unit groups (AUGs). The AU functions as an adapter between the higher-order path layer and the multiplexer section layer. As with the TUs, the AU consists of the payload and the AU pointer. The payload carries a higher-order VC, and the AU pointer indicates the relative offset between the starting positions of the AU payload and the frame of the multiplexer section layer.

One or more AUs occupying a fixed location in a payload are called an administrative unit group (AUG). An AUG can consist of three AU-3s or a single AU-4. The role of the AUG is to collect one or more AUs and load them onto a fixed location on the payload of the STM-N frame. The final product of the synchronous module structure STM-N is formed by byte-interleaving N AUGs with the addition of section overhead (SOH) at the beginning of its frame.

For each byte-interleaved path in a SONET/SDH frame there is a payload pointer that points to the start of a floating payload for that path, as discussed in more detail in the G.707 paper titled, "Network Node Interface for the Synchronous Digital Hierarchy (SDH)", Geneva: International Telecommunication Union, October 2000. The first byte of the floating payload is the first byte of the Path Overhead (POH), referred to in the art as the J1 byte. The POH bytes provide a means of communication between the point where the path payload is sourced and the point where the path payload is terminated. It is often required that the POH bytes be extracted or inserted for external monitoring and/or control of the POH bytes so that additional SONET or SDH application-specific features can be implemented external to the integrated circuit.

It should be appreciated by the skilled artisan that any interface implemented by a POH processor that attempts to implement extraction or insertion must be able to keep up with the data rate of the SONET/SDH data stream being extracted or inserted. In SONET/SDH, the data rate of the POH byte data stream can vary if there are pointer adjustments. Difficulty arises when there are either negative or positive pointer adjustments, i.e., there can be fewer or more than nine POH bytes per 125 μs SONET/SDH frame. Thus, it is important to find the peak data rate of the POH byte data stream. Negative pointer adjustments are discussed with reference to FIGS. 1 and 2.

A SONET/SDH frame has a period of 125 μs and a STM-N frame containing N AUG-1 may consist of (N*3) byte-interleaved AU-3 paths. The AU-3 pointers will each point to a floating VC-3 payload. Each VC-3 has its own POH bytes. When there are no AU-3 pointer adjustments each 125 μs frame has nine evenly distributed POH bytes for each VC-3. In this case each path has only one POH byte per row of the frame.

Figure 1:
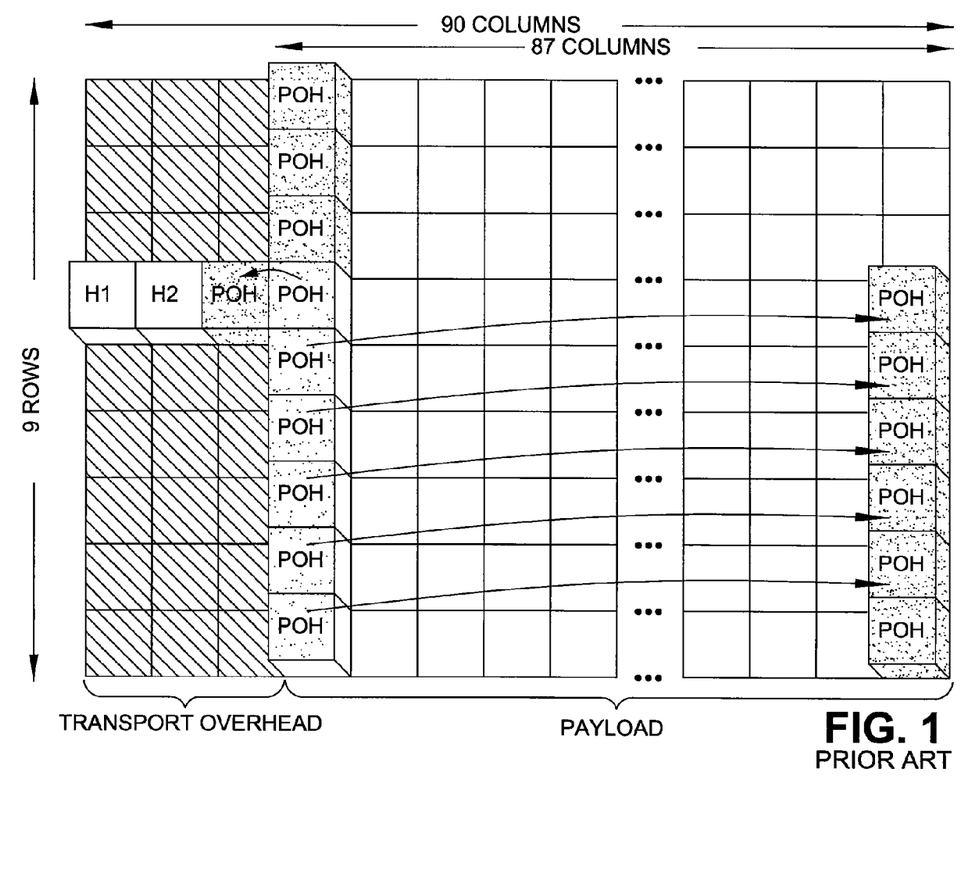
FIG. 1 is a schematic representation of a VC-3 in an AU-3 with a negative pointer justification of the prior art.

However, FIG. 1 shows a STM-0 frame where the minimum spacing between two consecutive POH bytes for the same path is occurring when there is an AU-3 negative pointer justification. A single 125 μs frame can now contain ten POH bytes from the same VC-3. Two POH bytes of the same VC-3 are located in a single row, one in the H3 position and one in the SPE#86 position of FIG. 1. Thus the minimum period of two POH bytes of the same path for a STM-N containing AU-3 paths is:

$$VC\text{-}3\ POH_{STM\text{-}N\ with\ AU\text{-}3,\ min\ period} = 87\ cycles,\ N=0$$

$$VC\text{-}3\ POH_{STM\text{-}N\ with\ AU\text{-}3,\ min\ period} = (N*3*87)\ cycles,$$
$$N=1, 4, 16, 64, 256 \qquad\qquad \text{Eqn 1}$$

An even worse case can occur in the TU-3 negative pointer justification situation. A STM-N frame containing N AUG-1 may consist of N AU-4 paths. The AU-4 pointers will each point to a floating VC-4 payload and each VC4 may contain three TUG-3 which each contains a TU-3. The TU-3 pointers will each point to a floating VC-3 payload. Each VC-4 and VC-3 will have its own POH. When there are no pointer adjustments each 125 µs frame has nine evenly distributed POH bytes for each VC-3 and VC-4. In this case each path has only one POH byte per row of the frame.

Figure 2:
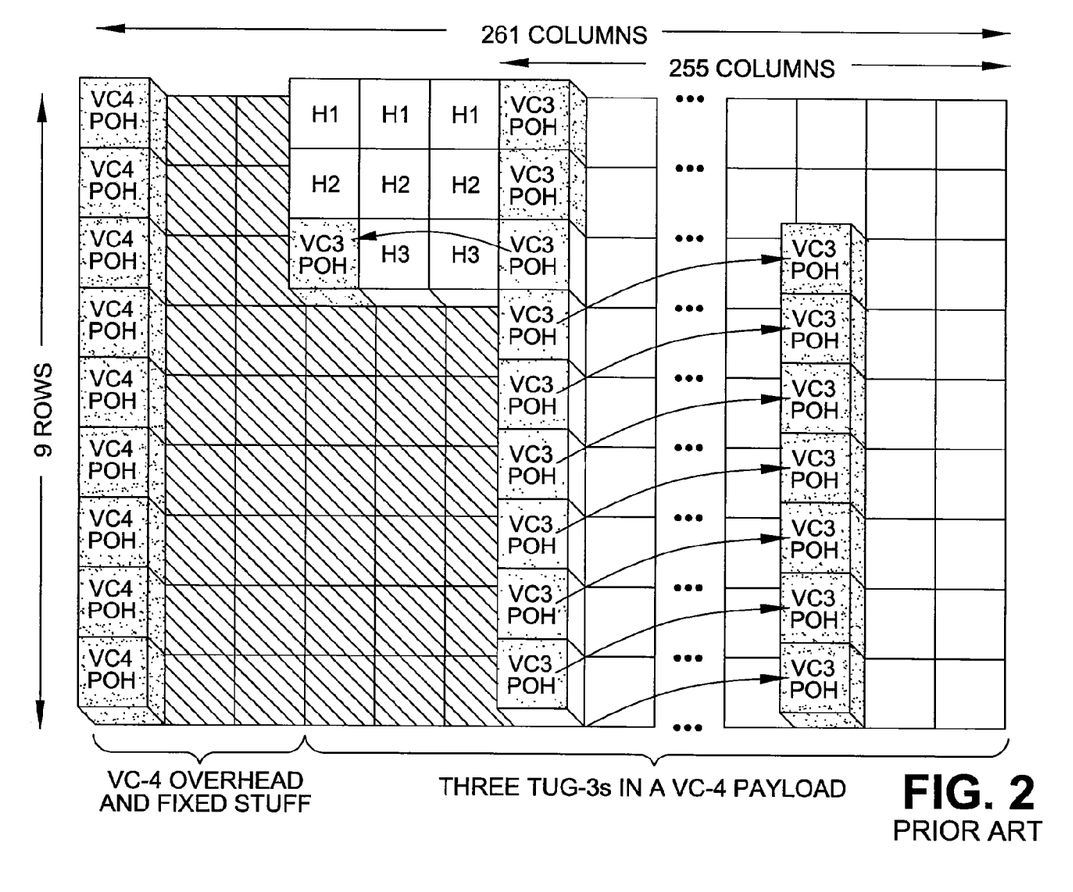
FIG. 2 is a schematic representation of a VC-4 with three TUG-3 with a negative pointer justification of the prior art.

However, FIG. 2 shows a STM-1 frame where the minimum spacing between two consecutive POH bytes for the same path is occurring when there is a TU-3 negative pointer justification. A 125 µs frame can now contain ten POH bytes from the same VC-3. In this case two POH bytes can be located on a single row, one at the H3 SPE#3 position and one at the SPE#258 position. Thus, the minimum period of two POH bytes of the same path for a STM-N containing TU-3 paths is:

$$VC\text{-}3\ POH_{STM\text{-}N\ with\ TU\text{-}3,\ min\ period} = (N*3*85)\ cycles,$$
$$N=1, 4, 16, \qquad\qquad \text{Eqn 2}$$

By comparison, Eqn 2 provides fewer cycles between consecutive POH bytes than Eqn 1.

The prior art U.S. Pat. No. 5,568,486, issued to Huscroft et al., discloses a method and architecture that extracts and inserts POH using a 125 µs frame on the external overhead interface. The 125 µs frame on the external overhead interface is divided into nine equal time periods (each the time period of each of the nine rows of the SONET/SDH payload) and each of the nine POH bytes for extraction or insertion is transmitted on the external overhead interface in turn according to its path overhead clock rates set by either path overhead clock signals (RPOHCLK or TPOHCLK).

The Huscroft et al. patent assumes that there will only be nine POH bytes per 125 µs frame on the external overhead interface to extract or insert. However, during negative pointer adjustments there can up to ten POH bytes in a given 125 µs SONET/SDH frame. During positive pointer adjustments there can be as few as eight POH bytes in a given 125 µs SONET/SDH frame. Extra buffering can be added to compensate for instantaneous data rate variations in the POH data stream. However, if over time there is a trend of positive pointer adjustments the buffer in the POH processor will eventually underrun during extraction and overflow during insertion. Similarly, if over time there is a trend of negative pointer adjustments the buffer in the POH Processor will eventually overflow during extraction and underrun during insertion.

The Huscroft et al. patent requires having a 125 µs frame on the overhead interface and the impact it has when creating the RPOHCLK or TPOHCLK, path overhead clock output signals. In order to have a 125 µs frame, the exact number of clock cycles needed to transfer a path's POH bytes in 125 µs is required but this rarely results in an integer divisor of the SONET/SDH clock. Thus a divided version of the SONET/SDH clock has to be gapped in order to lower its frequency to the desired frequency. For example, the '486 patent discloses a 576 KHz clock frequency to extract and insert a VC-4 POH in 125 µs. This is due to the fact that there are 9 POH bytes and each is 8 bits in size thus it will take 9*8=72 clock periods to serially transmit them. 125 µs * 576 KHz=72 clock periods thus the 576 KHz clock is required. However, a STM-1 frame is 2430 bytes in size thus the SDH clock frequency is 2430/125 µs=19.44 MHz. An integer divisor does not exist to create the 576 KHz clock from 19.44 MHz. Therefore, the closest frequency that can be gapped to create the 576 KHz clock and that can be created using an integer divisor is 19.44 MHz/30=648 KHz. Unfortunately, gapping a clock involves regularly "squelching" selected pulses of the clock, and as the frequency of the interface is scaled up a Digital Delay Locked Loop cannot be used to improve interface timing.

In the prior art, the U.S. Pat. No. 6,502,197, issued to Raza, discloses a means of combining the POH and Transport Overhead (TOH) interfaces to reduce the pin count and operates using a 125 µs frame on its overhead interface. It also provides a synchronization method that allows it to support long term data rate variations in the POH data stream due to positive and negative pointer adjustments.

The Raza patent obtains the POH bytes one row before they are actually processed and it is capable of transferring two POH bytes in a single row. Thus it will definitely require storage for more than one POH byte per path. This means that as the interface is scaled up to higher SONETISDH frame rates that the amount of storage required inside the POH processor becomes significant.

The Raza patent also requires having a 125 µs frame on the external overhead interface and the impact it has when creating the RPOHCLK or TPOHCLK. As mentioned with reference to U.S. Pat. No. 5,568,486, it is highly likely that a divided version of the SONET or SDH clock has to be gapped in order to lower its frequency to the desired RPOHCLK or TPOHCLK clock frequency.

The prior art WIPO publication, WO9322852A1, by Jennings et al., discloses a means of timing the transmission of overhead information within a data communications system over a backplane bus such that the far end of the bus samples the correct data. The teachings of the WIPO publication are directed toward the reliable transmission of the overhead information and not with creating an optimized interface for the extraction and insertion of overhead bytes.

The prior art U.S. Pat. No. 5,600,648, issued to Furuta et al., discloses a method in a SDH transmission system to selectively extract a specific POH from a specific virtual container. This allows the specific POH to be checked and thus "facilitate maintenance and inspection". This prior art patent does not however teach the efficient extraction of all of the POH bytes.

In the design of digital integrated circuits, it is highly desirable to minimize the area taken up by the circuit. A smaller circuit is generally physically easier to layout and meet timing. It also results in reduced fabrication costs and lower power consumption. By minimizing the amount of internal storage required for POH byte buffering, the surface area utilized for storage units in the circuit is minimized.

It is also highly desirable to minimize the frequency of operation of interfaces to a digital integrated circuit. A minimum frequency of operation makes it easier to meet interface timing and minimize power consumption. In addition, reducing the frequency of operation decreases the number of clock and signal transitions which results in lower noise.

Therefore, there is a need in the art to provide interfaces of a digital integrated circuit clocked by a periodic clock that is not gapped. A non-gapped clock enables the use of a Digital Delay Locked Loop to help improve interface timing. This is increasingly important as the data rate and clock frequency rises.

In view of the above-noted shortcomings, the present invention seeks to provide methods of implementing an extraction or insertion interface for time-multiplexed POH data streams that decouples the extraction and insertion operation from the flow of the SONET/SDH frames. The present invention seeks to provide the minimum amount of storage and the minimum required frequency of operation while at the same time maintaining a periodic clock. In addition, in the insertion case, the use of pipelining stages provides more flexibility in meeting interface timing.

SUMMARY OF THE INVENTION

The method and architecture of the present invention provides for the extraction of data from or the insertion of data into SONET or SDH frames is disclosed. The method and architecture provides an interface that permits the time-multiplexed data streams being extracted or inserted to have variable data-rates and no fixed alignment with respect to each other. The extraction and insertion interface accommodates for variable POH data rates and the alignment inconsistencies of POH bytes amongst different paths due to floating pointer positions. The interface operates at the lowest possible frequency that can still accommodate the minimum spacing between any two consecutive words of data for a given data stream.

According to the present invention, the interface device may be embodied in a Universal High Order Path Overhead Processor (POHP-U). The POHP-U implements an external path overhead interface consisting of a time-multiplexed stream of unaligned floating POH bytes with a timeslot for each path. The overhead interface provides both the extraction and insertion of POH bytes from SONET/SDH frames. In the insertion case, a minimum interface rate is determined that allows the requested POH bytes to arrive from the external device on the data stream "just in time" to be inserted in the SONET/SDH stream. In the extraction mode, a minimum interface rate is determined that allows the POH bytes to be extracted to the external device on the data stream "just in time", meaning just before the next POH byte for that path arrives in the SONET/SDH stream. The minimum interface rate is determined by finding the minimum possible POH byte spacing for a given path that is to be supported. The minimum interface rate is calculated by dividing SONET/SDH data rate with the minimum period of two consecutive POH bytes for a given path.

By allowing the path overhead bytes transmitted on the path overhead insertion/extraction interface to be unaligned and float with respect to each other with the extraction or insertion happening "just in time", the amount of buffering required inside the POHP-U is minimized. Only one byte of path overhead data per path need be buffered inside the POHP-U.

In the insertion case, the frequency of operation chosen also allows the pipelining of requests as well as the pipelining of the subsequent associated data in response.

The implementation of the present invention minimizes the amount of storage and enables a relatively low required frequency of operation while maintaining a smooth clock. In addition, in the insertion case, the pipelined nature of the interface provides flexibility in meeting interface timing.

According to the present invention, a normal smooth clock may be used to clock the external path overhead insertion/extraction interface. The clock frequency chosen for the interface clock will guarantee that the data rate on the external path overhead insertion/extraction interface exceeds the worst-case path overhead data rate of the SONET/SDH frame that we are inserting/extracting to/from.

In a first aspect, the present invention provides a method of decoupling a time-multiplexed data stream of overhead bytes from a time-multiplexed stream of data, said time-multiplexed stream of data consisting of overhead bytes and data bytes for a given path, said method comprising: a) determining a minimum interface rate based on a minimum overhead spacing between any two consecutive overhead bytes in said given data path and on a data rate of said stream of data; and b) interfacing between said time-multiplexed data streams of overhead bytes and said stream of data based on said minimum interface rate such that an operation is performed at a frequency that is at least equal to said minimum interface rate.

In a second aspect, the present invention provides a data network interface device for decoupling time-multiplexed a data stream of overhead bytes from a time-multiplexed stream of data, said time-multiplexed stream of data consisting of overhead bytes and data bytes for a given path, said interface device comprising: an overhead processing unit for processing said overhead data bytes, and for determining a minimum interface rate based on a minimum overhead spacing between any two consecutive overhead bytes in said given data path and on a data rate of said stream of data, said processing unit having: an extraction interface for transmitting to an external device said overhead bytes in a next available timeslot within a selected timeslot sequence, and signalling to said external device transmission of said overhead bytes in said next available timeslot; and an insertion interface for requesting said overhead byte from an external device in a next available timeslot within a selected timeslot sequence, and for receiving said overhead byte along said stream of data, and for receiving an indication of validity of said overhead byte received from said external device; wherein said interface device maintains a frequency of operation for said extraction interface and said insertion interface that is at least equal to said minimum interface rate.

In a third aspect, the present invention provides a machine-readable medium having stored thereon machine executable instructions that when executed implement a method of decoupling a time-multiplexed data stream of overhead bytes from a time-multiplexed stream of data, said time-multiplexed stream of data consisting of overhead bytes and data bytes for a given path, said method comprising: a) determining a minimum interface rate based on a minimum overhead spacing between any two consecutive overhead bytes in said given data path and on a data rate of said stream of data; and b) interfacing between said time-multiplexed data streams of overhead bytes and said stream of data based on said minimum interface rate such that an operation is performed at a frequency that is at least equal to said minimum interface rate.

DETAILED DESCRIPTION OF THE INVENTION

The invention will be described for the purposes of illustration only in connection with certain embodiments. However, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

It should be mentioned that both the SONET and SDH terminologies are used illustratively throughout this disclosure as both are applicable to the implementation of present invention.

The present invention provides an interface device which may be embodied in a Universal High Order Path Overhead Processor (POHP-U). According to the present invention, the POHP-U implements an external path overhead interface consisting of a time-multiplexed stream of unaligned floating POH bytes with a timeslot for each path. The overhead interface provides both the extraction and insertion of POH bytes from SONET/SDH frames. In the insertion case, a minimum interface rate is determined that allows the requested POH bytes to arrive from the external device on the data stream "just in time" to be inserted in the SONET/SDH stream. In the extraction mode, a minimum interface rate is determined that allows the POH bytes to be extracted to the external device on the data stream "just in time", meaning just before the next POH byte for that path arrives in the SONETISDH stream. The minimum interface rate is determined by finding the minimum possible POH byte spacing for a given path that is to be supported. The minimum interface rate is calculated by dividing SONET/SDH data rate with the minimum period of two consecutive POH bytes for a given path.

Figure 3:
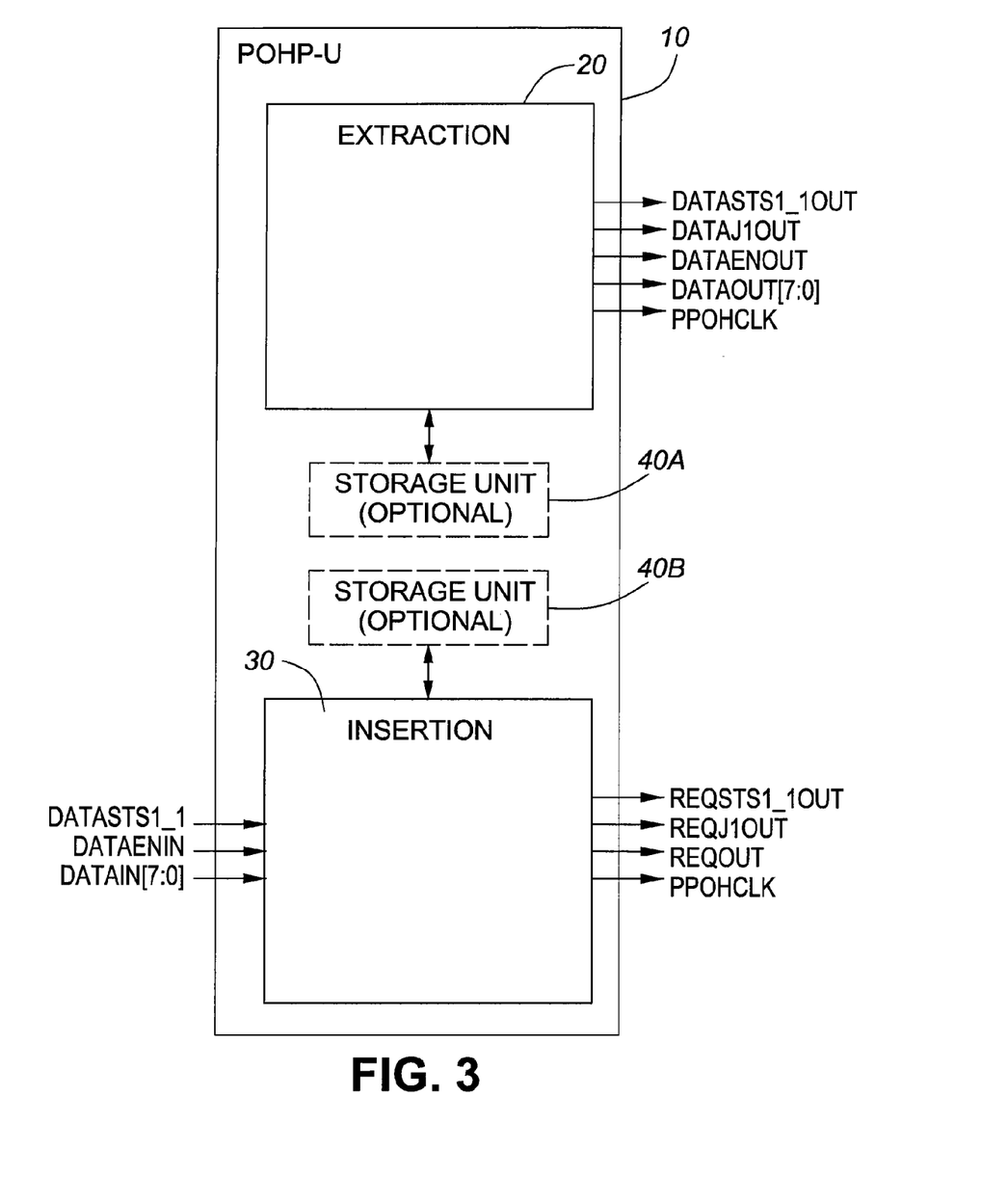
FIG. 3 is a block diagram illustrating the extraction and insertion interface inputs and outputs of the POHP-U according to the present invention.

Referring now to FIG. 3, a block diagram of the POHP-U device 10 implementing the overhead interface of the present invention. The POHP-U 10 includes the extraction interface device 20 and the insertion interface device 30 as shown in FIG. 3. The extraction interface 20 includes five outputs, DATASTS1_1OUT, DATAJ1OUT, DATAENOUT, DATAOUT[7:0], and PPOHCLK, for extraction of POH bytes to the external device on the SONETISDH data stream. The inputs interface 30 includes four outputs REQSTS1_1OUT, REQJ1OUT, REQOUT, and PPOHCLK, for requesting POH bytes from the external device, and three inputs, DATASTS_1, DATAENIN, and DATAIN[7:0], for the insertion of POH bytes arriving on the SONET/SDH data stream. Storage units 40A, 40B, optionally shown in FIG. 3, may be implemented within the POHP-U 10 for storage of the data streams extracted and inserted by the extraction device 20 and the insertion device 30, respectively.

The DATASTS1_1OUT output signal indicates the timeslot STS-1#1 (STM-0#1) on DATAOUT[7:0], DATAJ1OUT, and DATAENOUT among the time multiplexed interleaved STS-1/STM-0 paths. The STS-1#1 timeslot is the first STS-1 timeslot in the aggregate time multiplexed interleaved paths. The external device would flywheel off this indication to identify the STS-1/STM-0 paths. DATASTS1_1OUT runs at the clock rate represented by PPOHCLK.

The DATAJ1OUT output signal indicates the J1 byte on DATAOUT (when enabled by DATAENOUT) among the time multiplexed interleaved STS-1/STM-0 paths. The external device would flywheel off this indication for each path to identify the specific path overhead byte being extracted at any given time. The time interleaved path being referred to is to be determined using DATASTS1_1OUT. This output is not valid when DATAENOUT is low. DATAJ1OUT runs at the clock rate represented by PPOHCLK.

The DATAENOUT output signal identifies when a valid interleaved path overhead byte is available on DATAOUT for a given path among the time multiplexed interleaved STS-1/STM-0 paths. The time interleaved path being referred to is to be determined using DATASTS1_1OUT. The specific path overhead byte being extracted is to be determined using DATAJ1OUT. One enabled byte will occur for a given POH byte extraction opportunity in a given incoming SONET/SDH frame. DATAENOUT runs at the clock rate represented by PPOHCLK.

The DATAOUT[7:0] output signal contains the time multiplexed interleaved STS-1/STM-0 path overhead bytes (J1, B3, C2, G1, F2, H4, Z3, Z4, and Z5) for extraction. This output is not valid when DATAENOUT is low. DATAOUT[7] is the most significant bit. DATAOUT[0] is the least significant bit. DATAOUT runs at the clock rate represented by PPOHCLK.

The REQSTS1_1OUT output signal indicates the timeslot STS-1#1 (STM-0 #1) on the REQJ1OUT and REQOUT among the time multiplexed interleaved STS-1/STM-0 paths. The STS-1#1 timeslot is the first STS-1 timeslot in the aggregate time multiplexed interleaved paths. The external device would flywheel off this indication to identify the STS-1/STM-0 paths. REQSTS1_1OUT runs at the clock rate represented by PPOHCLK.

The REQJ1OUT output signal indicates that a J1 byte is being requested by REQOUT among the time multiplexed interleaved STS-1/STM-0 paths. The external device would flywheel off this indication for each path to identify the specific path overhead byte being requested at any given time. The time interleaved path being referred to is to be determined using REQSTS1_1OUT. This output is not valid when REQOUT is low. REQJ1OUT runs at the clock rate represented by PPOHCLK.

The REQOUT output signal identifies when a path overhead byte is being requested for a given path among the time multiplexed interleaved STS-1/STM-0 paths. The time interleaved path being referred to is to be determined using REQSTS1_1OUT. The specific path overhead byte being requested is to be determined using REQJ1OUT. One byte request will occur for a given POH byte insertion opportunity in a given incoming SONET/SDH frame. REQOUT runs at the clock rate represented by PPOHCLK.

The DATASTS1_1 input signal indicates the timeslot STS-1#1 (STM-0#1) on DATAIN[7:0] and DATAENIN among the time multiplexed interleaved STS-1/STM-0 paths. The STS-1#1 timeslot is the first STS-1 timeslot in the aggregate time multiplexed interleaved paths. This signal will be fed a cycle delayed version of REQSTS1_1OUT. The cycle delay can be implemented internal or external to the integrated circuit in which the POHP-U resides. If the cycle delay is implemented internal to the integrated circuit, DATASTS1_1 need not be provided as one of the device interface pins thus saving one device pin. The cycle delay chosen will model the pipelining cycle delay of the external interface combined with the external device latency. In this way the incoming DATAIN[7:0] and DATAENIN will be aligned with DATASTS1_1. The POHP-U will flywheel off this indication to identify the STS-1/STM-0 paths. DATASTS1_1 runs at the clock rate represented by PPOHCLK.

The DATAENIN input signal identifies when a valid path overhead data is available on DATAIN among the time multiplexed interleaved STS-1/STM-0 paths. DATAENIN will be provided by the external device on the overhead interface in response to a path overhead byte request REQOUT for a given path from the path overhead request stream. DATAENIN runs at the clock rate represented by PPOHCLK.

The DATAIN[7:0] input signal contains the time multiplexed interleaved STS-1/STM-0 path overhead bytes (J1, B3, C2, G1, F2, H4, Z3, Z4, and Z5) for insertion. This input is ignored when DATAENIN is low. DATAIN[7] is the most significant bit. DATAIN[0] is the least significant bit. DATAIN runs at the clock rate represented by PPOHCLK.

The PPOHCLK output signal provides timing for the parallel path overhead signals. This output is an internally generated clock. DATAENIN and DATAIN[7:0] are sampled on the rising edge of PPOHCLK. REQSTS1_1OUT, DATASTS1_1OUT, REQJ1OUT, DATAJ1OUT, REQOUT, DATAENOUT, and DATAOUT[7:0] are updated on the rising edge of PPOHCLK.

As mentioned in the prior art discussion, an interface protocol that attempts to implement extraction or insertion must be able to keep up with the peak data rate of the data stream being extracted or inserted. The POHP-U is designed to support the maximum combined POH data rate that can occur for the minimum POH byte spacing in a STM-N.

For example, the maximum combined data rate of all the TU-3 paths in a STM-N can be calculated by taking into account the SONET/SDH clock rate:

$$\text{VC-3 POH}_{STM-N \text{ with TU-3, max combined data rate}} = ((\text{SONET}/SDH \text{ clock rate})/\text{Eqn 2})*(N*3) \quad N=1, 4, 16, \quad \text{Eqn 3}$$

Table 1 shows the results of Eqn 3 for all combinations of aggregate Frame Rate that the POHP-U supports. If it is assumed that the POHP-U external POH interface has no inherent latency, then the results of Eqn 3 would determine the frequency of operation that the interface must exceed in order to operate correctly. However, implementations of this overhead interface may have latency that must also be taken into account when determining the frequency of operation required for the proper operation of the overhead interface.

TABLE 1

| Frame Rate STM-N | SONET/ SDH clock rate (MHz) | TU-3 VC-3 POH Min Individual Period in SONET/SDH clock cycles (Eqn 2) | TU-3 VC-3 POH Max Combined Rate (Mbyte/s) (Eqn 3) |
| --- | --- | --- | --- |
| 1 | 19.44 | 255.00 | 0.229 |
| 4 | 77.76 | 1020.00 | 0.915 |
| 16 | 311.04 | 4080.00 | 3.659 |

According to the present invention, there are no restrictions on how the interface timeslots relate to SONET/SDH timeslots or requirements that the order of the timeslots on the overhead interface mimic the order of the timeslots in the SONET/SDH stream (i.e., interface timeslot #1/SONET timeslot #6). The overhead interface assembles the POH bytes in a time multiplexed interleaved order such that the minimum data rate for each timeslot exceeds the maximum data rate of the POH bytes for each SONET/SDH path. The overhead interface is merely a constant flow of data where each path gets a time multiplexed interleaved opportunity. If a STM-N is being processed, then there will be N*3 time multiplexed path overhead data streams on the external interface. Each time multiplexed path overhead data stream need not be aligned with any other as any of the SONET/SDH timeslots could be mapped to any of the interface timeslots.

In extraction mode, a minimum interface rate is determined that allows a POH byte to be extracted to the external device on the data stream "just in time", or meaning just before the next POH byte for that path arrives in the SONET/SDH stream. The POHP-U transmits the received overhead bytes at the next appropriate opportunity based on the POH interface timeslot sequence chosen. When it does transmit a new value, it sets the enable signal DATAENOUT to logic one, which is otherwise set to logic zero. When the new value is a J1 byte, the DATAJ1OUT pulse indicator is also set to logic one. A frame pulse DATASTS1_1OUT that indicates the STS-1#1/STM-0#1 path is also provided.

Figure 4:
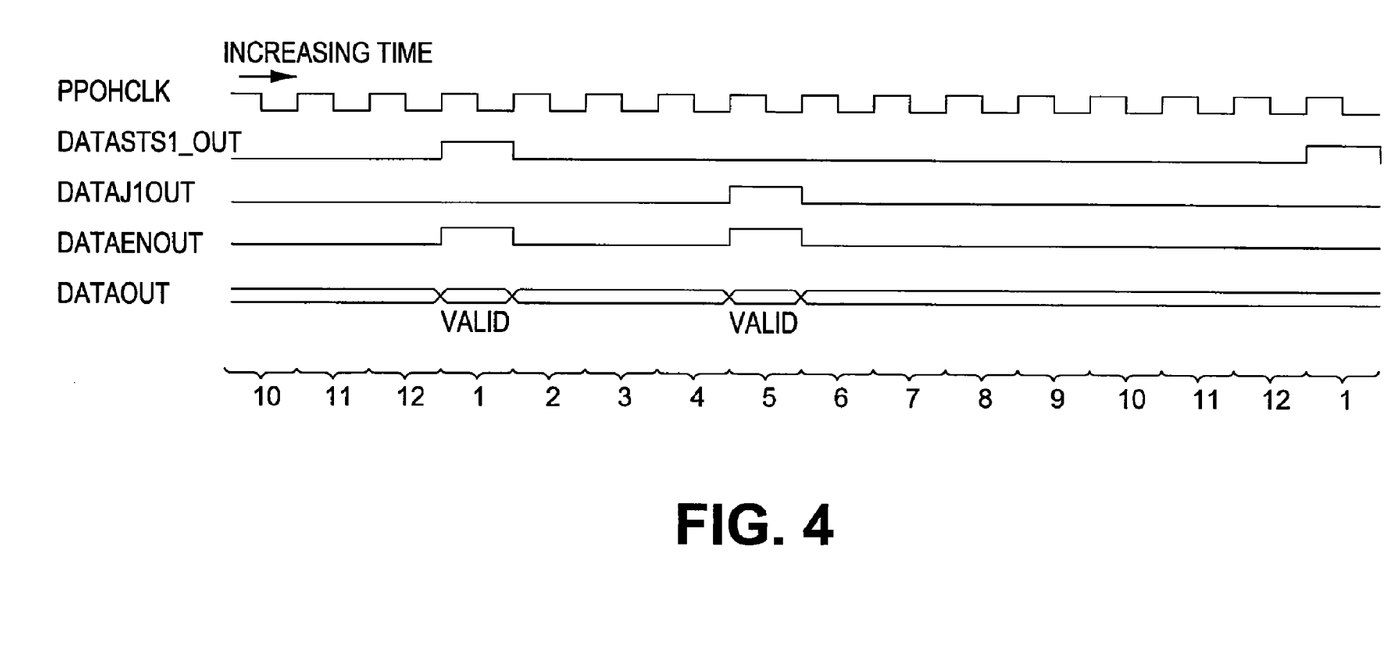
FIG. 4 is a timing diagram of a POH extraction for a STM-4 frame of the present invention.

FIG. 4 depicts the extraction of POH data for a STM-4 in a timing diagram. In this case, there are 12 time multiplexed path overhead data streams in the SONET/SDH that are extracted into 12 time multiplexed path overhead data streams on the external interface, shown as repeating 1, 2, . . . , 12 timeslots. In particular, a POH byte for path one (determined by the external device flywheeling off of the DATAJ1OUT and DATAENOUT indications for that path) and the J1 POH byte for path five in timeslot five 5 have arrived in the SONET/SDH stream and are in the process of being extracted. The DATASTS1_1OUT output signal is only asserted for path one in timeslot one 1. In this case, the POH interface timeslot sequence has been implemented as a simple incrementing count from one to twelve.

In the insertion mode, once a POH byte for a given path is inserted the next POH byte for that path is requested at the next earliest opportunity (in the next timeslot for that path) on the overhead interface request stream. As previously, eight, nine, or ten POH bytes may be requested for insertion per path per frame, depending on pointer justifications. POH bytes for a given path are requested in the order that they are to be transmitted. The external device responding to the request provides the POH bytes on the data stream in direct response to the request. It never provides unsolicited information. The external device can choose to ignore a request thus allowing the data on the SONET/SDH stream to pass through the POHP-U unmodified. A minimum interface rate is determined that allows the requested POH bytes to arrive from the external device on that data stream "just in time" to be inserted in the SONET/SDH stream.

In insertion mode, the POHP-U tracks and generates two information flows: the request flow and the data flow. The request flow is generated by the POHP-U and is transmitted to the external interface. It indicates when each time slot is ready to receive a new byte value REQOUT and when the received overhead byte should be a J1 overhead byte REQJ1OUT. One byte request REQOUT will always occur for a given POH byte insertion opportunity in a given incoming SONET/SDH frame. The external device is not required to respond to a request, it can choose not to insert any given path overhead byte simply by not responding to the request. If the external device does not respond to a request for a specific POH byte the POHP-U will not modify that POH byte in the SONET/SDH stream. A request frame pulse REQSTS1_1OUT that indicates the STS-1#1/STM-0#1 path is also provided. This request frame pulse is passed out to the external interface along with the time multiplexed byte request indications REQJ1OUT and REQOUT.

The external device then reacts to the request with the data flow that is subsequently consumed by the POHP-U. The data flow contains the time multiplexed overhead byte to be inserted DATAIN[7:0] accompanied by its enable signal marking the validity of the data DATAENIN, the enable signal is set to logic one when the data is valid and set to logic zero otherwise. The data is then stored an inserted into the SONET/SDH stream at the next opportunity. In this scheme the external POH device is slave to the request flow and must supply the bytes in the data flow only in the timeslot that they are requested.

Figure 5:
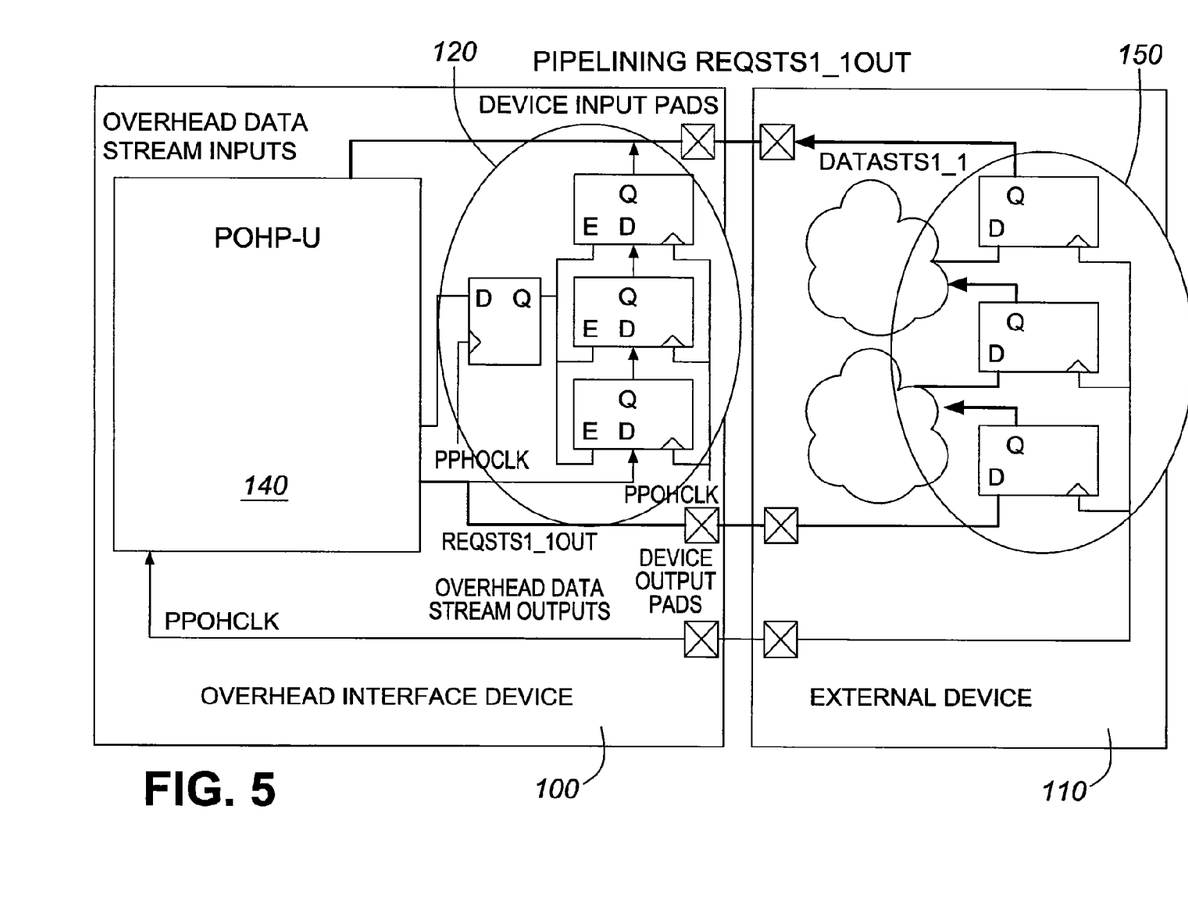
FIG. 5 is a block diagram of the pipelining stages for providing insertion cycle delays according to one embodiment of the present invention.

The request frame pulse REQSTS1_1OUT can be cycle delayed to become the data frame pulse DATASTS1_1. The cycle delay can be implemented external to the device if data output DATASTS1_1 is provided as one of the overhead interface pins or implemented internal to the device thus saving one device pin, as shown in FIG. 5 for the overhead interface in insertion mode. In FIG. 5, the REQSTS1_1OUT signal fed from the overhead interface device 100 to the external device 110 has been modified to provide a signal delay through pipelined stages 120 operatively coupled to the POHP-U 140 of the present invention. The number of pipelined stages 120 provided in the overhead interface 100 device mimics the delay cycles 150 of the external device. This ensures that the delay of PPOHCLK clock cycles models the number of PPOHCLK cycles that the external device 110 requires to respond to the request. By modeling the pipelined clock cycles of the overhead interface 100 to that of the external device 110, one less device-level pin is required in an integrated circuit design. If the request REQSTS1_1OUT is issued by the external device 110, the data frame pulse DATASTS__1 is fed from the external device 110 to the insertion interface device (not shown) within the POHP-U 140, thus aligning the path overhead byte and associated enabled indication byte for insertion of the path overhead byte. If the internal cycle delay is programmable into an integrated circuit chip a variable amount of external device pipelining cycle latency could be supported, thus providing flexibility to the external device in the number of pipelining stages that it may require. The total amount of latency allowed is limited though by the theoretical maximum POH data rate that can occur within SONET/SDH stream.

Figure 6:
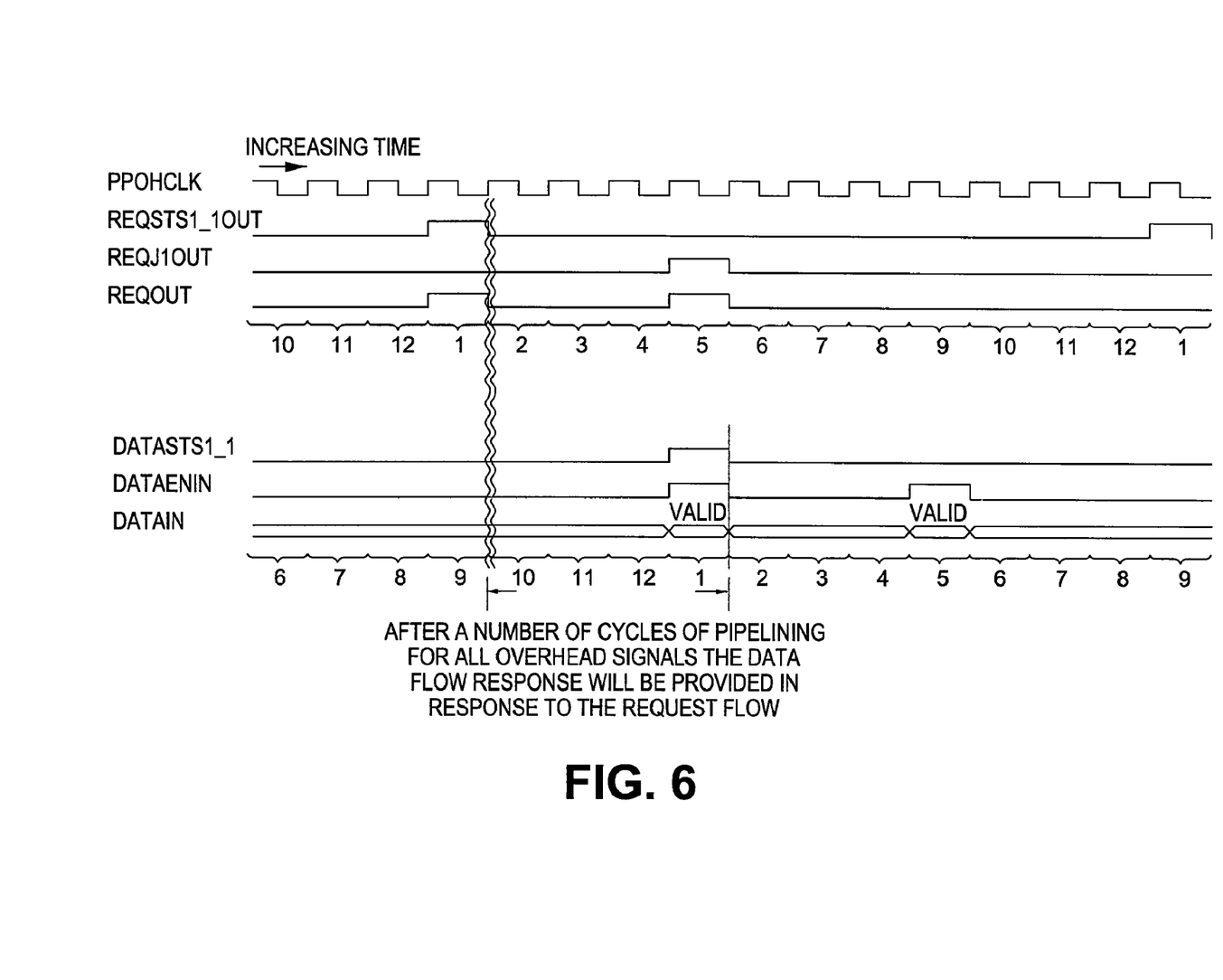
FIG. 6 is a timing diagram of a POH insertion for a STM-4 frame of the present invention.

FIG. 6 depicts the insertion of POH data for a STM-4 in a timing diagram. In this case there are 12 multiplexed path overhead data streams (the request flow and data flow) on the external interface that will be inserted into 12 time multiplexed path overhead data streams in the SONET/SDH, shown as repeating 1, 2, . . . , 12 timeslots. In particular, a POH byte for path one I timeslot (determined by flywheeling off the external device the REQJ1OUT and REQOUT indications for that path) and the J1 POH byte for path five 5 are being requested. The external device is responding to the request, after a design-specific amount of pipelining latency, with the data flow for eventual insertion into the SONET/SDH stream. The theoretical maximum amount of pipelined latency is determined by the maximum SONET/SDH POH data rate. It can be seen that REQSTS1_1OUT is only asserted during the path one I timeslot. In this case, the POH interface timeslot sequence has been again chosen as a simple incrementing count from one to twelve.

It should be noted that the external device is not required to provide any byte for insertion and can choose not to. Also, there is no consistent timing relationship between the arrival of a SONET/SDH POH byte timeslot and when a request is issued on the overhead insertion interface for the next POH byte for that path. The timing relationship between the arrival of the requested data and when it is actually inserted in the appropriate SONET/SDH POH byte path is also not consistent. This is due to the fact that the overhead insertion interface is operating at a faster rate than the SONET/SDH data. Thus, the only consistent requirement of the insertion interface is that it allows for sufficient time to send a request and receive the data for insertion in a SONET/SDH POH byte path before the next SONET/SDH POH byte opportunity arrives for that path.

The method and architecture disclosed can be applied to extract or insert overhead data from/to multiple SONET/SDH slices or streams via a single external overhead interface. For example four parallel STM-4 byte-serial SONET/SDH slices comprising an aggregate STM-16 could be extracted from or inserted into a single external overhead interface operating at a suitable frequency to accommodate the maximum combined overhead data rate of the four SONET/SDH slices. In this situation, the previous calculations of Eqn 3 need to be modified to take into account the number of slices of SONET/SDH being processed:

Since the POHP-U can be used to process larger SONET/SDH slices or streams Eqn 2 needs to be modified to take the number of slices into account:

$$\text{VC-3 POH}_{STM\text{-}N \text{ with } Tu\text{-}3,\ min\ period} = ((N*3*85)/\# \text{ slices}) \text{ cycles } N=1, 4, 16, 64, 256 \quad \text{Eqn 4}$$

With the minimum period of each individual TU-3 path in a STM-N calculated, the maximum combined data rate of all the TU-3 paths in a STM-N can be calculated by taking into account the slice SONET/SDH clock rate:

$$\text{VC-3 POH}_{STM\text{-}N \text{ with } TU\text{-}3,\ max\ combined\ data\ rate} = ((\text{SONET/SDH clock rate})/\text{Eqn 4})*(N*3)\ N=1, 4, 16, 64, 256 \quad \text{Eqn 5}$$

Table 2 shows the results of Eqn 5 for all combinations of aggregate frame rate and number of slices that the POHP-U supports. If it is assumed that the POHP-U external POH interface has no inherent latency, then the results of Eqn 4 would determine the frequency of operation that the interface must exceed in order to operate correctly. However, the POHP-U external POH interface does have latency as discussed in the following sections.

TABLE 2

| Frame Rate STM-N | # slices | Slice SONET/SDH clock rate (MHz) | TU-3 VC-3 POH Min Individual Period in SONET/SDH clock cycles (Eqn 4) | TU-3 VC-3 POH Max Combined Rate (Mbyte/s) (Eqn 5) |
|---|---|---|---|---|
| 1 | 1 | 19.44 | 255.00 | 0.229 |
| 4 | 1 | 77.76 | 1020.00 | 0.915 |
| 4 | 4 | 19.44 | 255.00 | 0.915 |
| 16 | 1 | 311.04 | 4080.00 | 3.659 |
| 16 | 4 | 77.76 | 1020.00 | 3.659 |
| 16 | 16 | 19.44 | 255.00 | 3.659 |
| 64 | 4 | 311.04 | 4080.00 | 14.637 |
| 64 | 16 | 77.76 | 1020.00 | 14.637 |
| 256 | 16 | 311.04 | 4080.00 | 58.549 |

When there is more than one slice, each POHP-U tracks the sequence for all POHP-U slices. It propagates the information coming from the previous slice when waiting and processes its data when the sequence enables it to control the interface.

In particular, for the extraction interface, the master slice is the source of a master frame pulse DATASTS1_1OUT that indicates the STS-1#1/STM-0#1 path. This frame pulse is passed between slices then out the last slice to the external interface along with the time multiplexed path overhead byte for extraction DATAOUT[7:0] and the associated DATAJ1OUT and byte enabled DATAENOUT indications.

In the insertion mode, each POHP-U tracks and generates two information flows: the request flow and the data flow. The request flow is generated by each POHP-U and is transmitted to the external interface via the last POHP-U slice. More particularly, in insertion mode, the first POHP-U slice (or "master" slice) is the source of a master request frame pulse REQSTS1_1OUT that indicates the STS-1#1/STM-0#1 path. This request frame pulse is passed between the slices then out the last slice to the external interface along with the time multiplexed REQJ1OUT and byte request indications REQOUT.

The external device then reacts to the request with the data flow that is subsequently consumed by the master slice POHP-U. The data flow contains the time multiplexed overhead byte to be inserted DATAIN[7:0] accompanied by its enable signal marking the validity of the data DATAENIN, the enable signal is set to logic one when the data is valid and set to logic zero otherwise.

Internal to the device the request frame pulse REQSTS1_1OUT from the last slice will be cycle delayed then fed to the master slice as the data frame pulse. The cycle delay chosen will model the cycle delay of the external interface and external device latency. In this way, the data frame pulse coming into the master slice will be aligned with the path overhead byte and associated byte enabled indication for insertion. If this internal cycle delay is programmable a variable amount of external device cycle latency can be supported up to a theoretical maximum.

In the implementation of the POHP-U, a single clock domain can be maintained to alleviate cross-clock domain signalling, synchronization, and latency issues. For the case of multiple POHP-Us connected together to process a larger SONET/SDH stream, their respective parallel input clock inputs can be synchronized for a single clock domain. However, the present invention is not limited to operating in a single clock domain.

The method and architecture of the present invention could also be modified to extract or insert overhead data from/to multiple SONET/SDH slices or streams via a single external overhead interface but where each SONET/SDH slice or channel is operating in a different clock domain.

With the SONET/SDH channels operating in different clock domains, it is expected that there will be some clock rate variation between those clocks. Thus, the maximum data rate of the overhead bytes in the SONET/SDH being extracted or inserted amongst the different channels will vary due to the relative variation between the clocks of the SONET/SDH channels. If the overhead interface clock is generated from one of the SONET/SDH channel clocks (or from a completely separate source), the relative data rate achieved by the overhead interface with respect to the data rate of the overhead bytes in the SONET/SDH channel will fluctuate.

As the extraction and insertion interface disclosed has no alignment between the SONET/SDH streams and the external interface, all that need be done to accommodate clock rate variations between the different SONET/SDH clocks is to ensure that the overhead interface operates at a minimum frequency that provides enough headroom to accommodate those variations and any required cross-clock domain signalling latency.

The method and architecture disclosed could be modified to extract or insert any number of different data rate streams from or into any other data stream. This could be provided by creating a programmable calendar of the timeslot sequencing that divides and assigns different amounts of the overhead interface's total data rate to specific data streams being extracted or inserted.

The method and architecture of the present invention could be readily applied to the extraction and insertion of Transport Overhead (TOH) or Section Overhead (SOH) in a SONET/SDH communications system.

The present invention may also provide for extra storage to accommodate for bursts of data streams being extracted or inserted. Thus, the interface rate can be set at a known maximum average data rate of the burst of data streams. FIG. 3 illustrates optional data storage units 40A, 40B in the POHP-U 10 for storing bursts of data streams extracted or inserted by the extraction and the insertion devices 20, 30, respectively.

Figure 7:
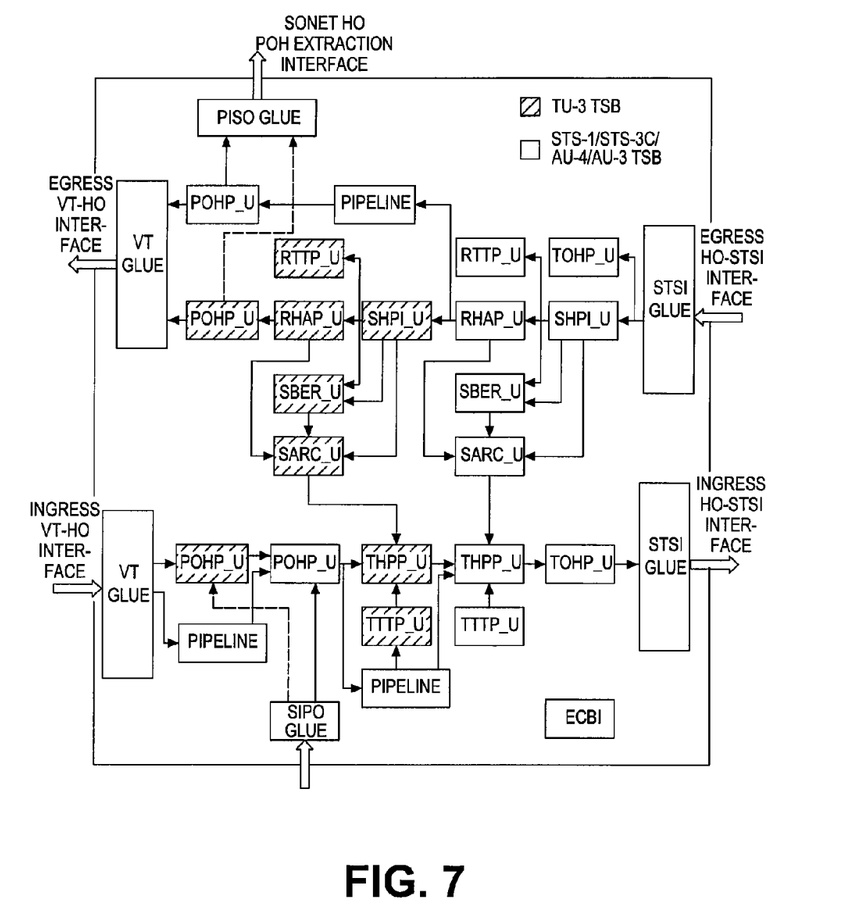
FIG. 7 is a block diagram SONET/SDH Subsystem with POH extraction and insertion provided in the POHP-U according to another of the present invention.

FIG. 7 illustrates a typical SONET/SDH subsystem in which a POH interface (POHP-U) exists. The Telecommunication System Blocks (TSB) immediately upstream of the POHP-U implement all SONET/SDH pointer processing and provide all the indication signals required to identify and extract or insert the POH.

In terms of commercial significance, the present invention is advantageous in the practical design of complex digital integrated circuits for communications. For such designs, it is highly desirable to reduce the circuit area by reducing the amount of data storage required. In order to meet interface timing and minimize power dissipation it is also highly desirable to minimize the frequency of operation of interfaces to a digital integrated circuit.

The present invention is useful in communication systems utilizing SONET or SDH where the POH is terminated in an integrated circuit and provided on an external interface.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. A method of decoupling a time-multiplexed data stream of overhead bytes from a time-multiplexed stream of data having a variable data rate, said time-multiplexed stream of data consisting of overhead bytes and data bytes for a given path, said method comprising:
   a) finding a minimum period between two consecutive unaligned floating path overhead bytes in said stream of data;
   b) determining a minimum interface rate by dividing said variable data rate of said stream of data by said minimum period; and
   c) interfacing between said time-multiplexed data stream of overhead bytes and said stream of data based on said minimum interface rate such that an operation of extracting overhead bytes from the stream of data is performed at a frequency that allows the overhead bytes to be extracted from the stream of data just before the next overhead byte for the given data path arrives in the stream of data.

2. The method as claimed in claim 1, wherein said operation in said interfacing step further includes:
   c1) transmitting to an external device said overhead bytes in a next available timeslot within a selected timeslot sequence; and
   c2) signalling to said external device transmission in step c1) of said overhead bytes in said next available timeslot.

3. The method as claimed in claim 1, wherein said frequency of operation is synchronized for a single clock domain.

4. The method as claimed in claim 1, wherein the frequency of operation is determined based on the minimum interface data rate and a cross clock domain signalling latency.

5. A data network interface device for decoupling a time-multiplexed data stream of overhead bytes from a time-multiplexed stream of data having a variable data rate, said time-multiplexed stream of data consisting of overhead bytes and data bytes for a given path, said interface device comprising:
   an overhead processing unit for processing said overhead data bytes, including finding a minimum period between two unaligned floating consecutive path overhead bytes in said stream of data, and determining a minimum interface rate by dividing said variable data rate of said stream of data by said minimum period, said processing unit having:
   an extraction interface for transmitting to an external device said overhead bytes in a next available timeslot within a selected timeslot sequence, and signalling to said external device transmission of said overhead bytes in said next available timeslot; and
   an insertion interface for requesting an overhead byte of said overhead bytes from an external device in a next available timeslot within a selected timeslot sequence, and for receiving said overhead byte along said stream of data, and for receiving an indication of validity of said overhead byte received from said external device;
   wherein said interface device maintains a frequency of operation for said extraction interface and said insertion interface that allows overhead bytes to be extracted from the stream of data just before the next overhead byte for the given data path arrives in the stream of data, and inserted into the stream of data just before the next overhead byte opportunity arrives in the stream of data.

6. The data network interface device as claimed in claim 5, further comprising a storage device for buffering bursts of data streams arriving at either said insertion interface or said extraction interface.

7. The data network interface device as claimed in claim 5, wherein said data network interface device provides pipelining stages that models any external device latency by an equivalent number of clock cycles to align receipt of said overhead byte with said indication of validity transmitted from said external device to said insertion interface.

8. The data network interface device as claimed in claim 5, wherein said data network interface device provides a minimum amount of storage to absorb a data burst of said stream of data in either extraction mode or insertion mode.

9. The data network interface device as claimed in claim 5, wherein said data network interface device includes a programmable calendar for dividing and assigning a portion of a total data rate of said data network interface device to a specific stream of data.

10. The data network interface device as claimed in claim 5, wherein said network interface device includes a plurality of interface devices for decoupling multiple channels, and wherein each of said plurality of interface devices includes a parallel clock that is synchronized for a single clock domain.

11. The data network interface device as claimed in claim 5, wherein said network interface device includes a plurality of interface devices for decoupling multiple channels, and wherein each of said plurality of interface devices includes a parallel clock that is provided with different clock domains such that each of said plurality of interface devices maintains a minimum frequency of operation that provides sufficient headroom to accommodate for signal clock variations and cross-clock domain signalling latency.

12. The data network interface device as claimed in claim 5, wherein the frequency of operation is determined based on the minimum interface data rate and a cross clock domain signalling latency.

13. A computer-readable medium having stored thereon machine executable instructions that when executed implement a method of decoupling a time-multiplexed data stream of overhead bytes from a time-multiplexed stream of data having a variable data rate, said time-multiplexed stream of data consisting of overhead bytes and data bytes for a given path, said method comprising:
   a) finding a minimum period between two consecutive unaligned floating path overhead bytes in said stream of data;
   b) determining a minimum interface rate by dividing said variable data rate of said stream of data by said minimum period; and
   b) interfacing between said time-multiplexed data stream of overhead bytes and said stream of data based on said minimum interface rate such that an operation of extracting overhead bytes from the stream of data is performed at a frequency that allows the overhead bytes to be extracted just before the next overhead byte for the given data path arrives in the stream of data.

14. The computer-readable medium as claimed in claim 13, wherein said operation in said interfacing step further includes:
   c1) transmitting to an external device said overhead bytes in a next available timeslot within a selected timeslot sequence; and
   c2) signalling to said external device transmission in step c1) of said overhead bytes in said next available timeslot.

15. The computer-readable medium as claimed in claim 13, wherein said frequency of operation is synchronized for a single clock domain.

16. The computer-readable medium as claimed in claim 13, wherein the frequency of operation is determined based on the minimum interface data rate and a cross clock domain signalling latency.

17. A method of decoupling a time-multiplexed data stream of overhead bytes from a time-multiplexed stream of data having variable data rate, said time-multiplexed stream of data consisting of overhead bytes and data bytes for a given path, said method comprising:
   a) finding a minimum period between two consecutive unaligned floating path overhead bytes in said stream of data;
   b) determining a minimum interface rate by dividing said variable data rate of said stream of data by said minimum period; and
   c) interfacing between said time-multiplexed data stream of overhead bytes and said stream of data based on said minimum interface rate such that an operation of inserting overhead bytes into the stream of data is performed at a frequency that allows the overhead bytes to be inserted just before the next overhead byte opportunity arrives in the stream of data.

18. The method as claimed in claim 17, wherein said operation in said interfacing step further includes:
   c1) requesting said overhead byte from an external device in a next available timeslot within a selected timeslot sequence; and
   c2) if issued from said external device, receiving said overhead byte along said stream of data and receiving an indication of validity of said overhead byte received for insertion from said external device.

19. The method as claimed in claim 17, further including a step of delaying said operation in step c) for a number of clock cycles to accommodate for any external latency through use of pipelining stages.

20. The method as claimed in claim 17, wherein the frequency of operation is determined based on the minimum interface data rate and a cross clock domain signalling latency.

21. A computer-readable medium having stored thereon machine executable instructions that when executed implement a method of decoupling a time-multiplexed data stream of overhead bytes from a time-multiplexed stream of data having a variable data rate, said time-multiplexed stream of data consisting of overhead bytes and data bytes for a given path, said method comprising:
 a) finding a minimum period between two consecutive unaligned floating path overhead bytes in said stream of data;
 b) determining a minimum interface rate by dividing said variable data rate of said stream of data by said minimum period; and
 c) interfacing between said time-multiplexed data stream of overhead bytes and said stream of data based on said minimum interface rate such that an operation of inserting overhead bytes into the stream of data is performed at a frequency that allows the overhead bytes to be inserted just before the next overhead byte opportunity arrives in the stream of data.

22. The computer-readable medium as claimed in claim 21, wherein said operation in said interfacing step further includes:
 c1) requesting an overhead byte of said overhead bytes from an external device in a next available timeslot within a selected timeslot sequence; and
 c2) if issued from said external device, receiving said overhead byte along said stream of data and receiving an indication of validity of said overhead byte received for insertion from said external device.

23. The computer-readable medium as claimed in claim 21, further including a step of delaying said operation in step c) a number of clock cycles to accommodate for any external latency through use of pipelining stages.

24. The computer-readable medium as claimed in claim 21, wherein the frequency of operation is determined based on the minimum interface data rate and a cross clock domain signalling latency.

* * * * *